United States Patent [19]
Camardella

[11] 3,806,051
[45] Apr. 23, 1974

[54] MULTIPLE COIL-WINDER

[76] Inventor: Giuseppe Camardella, Via E. Biondi, 1, 20154 Milan, Italy

[22] Filed: May 24, 1971

[21] Appl. No.: 146,060

[30] Foreign Application Priority Data
May 23, 1970 Italy.................................. 25048/70

[52] U.S. Cl............. 242/7.11, 140/92.2, 242/158.5
[51] Int. Cl...... H01f 41/06, B21f 3/04, B65h 54/20
[58] Field of Search...... 242/7.09, 7.11, 7.15, 25 A, 242/158.4, 158.5

[56] References Cited
UNITED STATES PATENTS

| | | | |
|---|---|---|---|
| 3,011,729 | 12/1961 | Scholten | 242/7.15 |
| 3,402,903 | 9/1968 | Camardella | 242/158.5 |
| 1,970,934 | 8/1934 | Haegele et al. | 242/7.09 |
| 3,106,351 | 10/1963 | Fulton | 242/7.09 X |
| 3,101,180 | 8/1963 | Sadorf | 242/7.11 X |

Primary Examiner—Billy S. Taylor
Attorney, Agent, or Firm—Young and Thompson

[57] ABSTRACT

A multiple coil-winder, for the production of coils having an average or a high number of turns, comprising an intermittently rotating support table, a plurality of rotating mandrels carried on the periphery of said support table, wire-guide means mounted on said support table and associated with each mandrel, said wire-guide means controlling the distribution of the turns during coil winding, and a centralized control unit which imparts the motion law both to said rotating mandrels and to said wire-guide means. Coaxial to said support table is moreover provided a spools support, to which is imparted a constant uniform rotation motion, the uniform rotation speed of said spool support being equal to the average speed of said intermittently rotating table.

27 Claims, 13 Drawing Figures ly high
MULTIPLE COIL-WINDER

BACKGROUND OF THE INVENTION

Field of the Invention

The present invention relates to a coil-winding machine particularly of the type for the high speed production of coils having a single winding and a large number of turns.

Coils of such a type are generally employed in the production of electromagnets of relays, of pneumatic or hydraulic electrovalves and the like.

Coil-winding machines hitherto produced to meet the above-mentioned requirements must all be subject to the basic consideration that the time necessary to fulfill the complete winding of a coil is — even when coil-holding/mandrels having very high rotating speed are employed — remarkably longer than the loading or unloading time, or even the time during which a complementary operation is effected such as the automatic hooking of the wire at the beginning of the winding, the fixing of the coil turns by tape or wax, the application of a protecting tape to the beginning end, the twisting of coil ends onto one or two terminals, or similar operations known per se and carried out by known means.

Therefore if in a basic system a coil is made to advance step by step through a loading station of an empty coil core, a station in which the wire is wound onto the core, one or more stations for complementary operations, and an unloading station, the productivity of the machine is strictly limited by the time necessary for the winding operation. In other words, an increase in productivity can be obtained only by increasing the winding speed. On the other hand, also for such a speed increase there are critical limits, beyond which serious problems arise, not only for the feeding of the wire but above all owing to a static and dynamic unbalance of the coil cores.

Description of the Prior Art

Bearing in mind the above, present machines are all based on the principle of using — along a closed path — a number of winding heads in cooperation with a single station for each of the complementary operations; by complementary operations we mean, hereinafter, besides the indispensable operations of loading and unloading, one or more of the above mentioned operations.

One of the solutions chosen for the practical carrying-out of the said principle consists in arranging along a part of or the whole periphery of a rotating table, adapted to move by steps, a plurality of winding heads. Outside said table in fixed positions contained in a relatively restricted circular sector, there are provided the complementary stations. Each head produces a complete winding during the time in which the table effects practically a complete revolution, that is to say during the time while the head is transferred, thanks to the rotation of the table from the last to the first complementary station.

Said machines, thus conceived, are in fact capable of achieving high productivity, however they are far from being free from drawbacks. Such drawbacks become the more evident the higher is the productivity required. Among said drawbacks we must particularly note the following:

a. The cost of a winding head is generally rather high so that it affects remarkably the total cost of the machine; we must not forget, in fact, that each winding head is provided with its own driving motor, with a transmission having a variable speed ratio for the driving of the coil-holding mandrel, with a wire-guide provided with means for the adjustment of pitch and stroke, and with a turn-counting system. Therefore an increase in the productivity of the machine implies a direct increase in the number of winding-heads, viz. a remarkable increase in the total cost. This increase in cost is so remarkable that the number of heads is by no means limited whenever a lower number of turns per coil permits reducing the winding time, with the result — however — that the machine has bery limited flexibility.

b. The arrangement of a plurality of heads along the periphery of a rotating table imparts a high moment of inertia of the system; in this regard it is necessary to remember that we must consider, for each winding head, not only the weight of the head itself but also of the feeding copper-wire spool which obviously follows the movement of the head. It is easy to imagine the difficulties provided by this remarkable mass when it must be made to advance by steps, both at the moment of starting and at the moment of stopping. In some constructions it has been attempted to solve this problem by reducing the weight of the feeding spools; however this implies that each feeding spool contains a limited quantity of wire and as a consequence the exhausted spools must be replaced much more frequently. Since the machine must be stopped for each replacement, it is evident that all this finally means a reduction of the productivity of the machine. According to a different known construction the unit of the winding heads with the respective spools is made to rotate by a continuous movement, while to the automatic means provided for the complementary operations is imparted a compound movement, i.e. a slow advance (parallel to the heads) and a quick return (to meet with the following finished coil) along a circular arc of an amplitude corresponding to the amplitude of an arc delimited by two successive winding heads. As is easy to understand, if by this solution the mass subjected to an intermittent movement has been reduced, nevertheless a complication has certainly been introduced in the kinematic movements controlling the complementary equipment, so that this too cannot be considered the correct solution of the problem.

c. The wire feeding spools are mounted above each winding head. This means — considering that the heads are at the same level as the operators — that the spools are remarkably high; which means that they are not easy to reach and — especially when heavy spools are involved, as is essential to reduce to the minimum the interruptions owing to exhaustion of wire — long and tiring replacement operations are required, often also with the help of lifting winches. Similar difficulties are encountered when it is necessary to inspect the position of the wire between the spool and the wire-stretcher.

d. Considering that each winding head must necessarily be independent from the others performing similar work, it is a must — at each change of work, viz. type of coil produced — to adjust separately each head as to its winding parameters, that is to say: pitch of the wire, number of turns, winding speed, path of the wire-guide.

SUMMARY OF THE INVENTION

All such drawbacks are avoided or at least remarkably reduced in the machine of the present invention.

A first fundamental feature of the machine of the present invention lies in the fact that the control of the winding of the single coils is effected starting from the centralized means. In particular, on the one hand, to each winding mandrel combined with an intermittently rotating table is imparted a rotation — through activating means associated therewith — by motor means in common with all the other mandrels, said motor means being fixedly mounted on the casing of the machine, between said motor means and said mendrels being provided transmission means practically not affected by the relative movements between rotating table and fixed motor means; on the other hand, to each wire-guide mobile with respect to each mandrel is imparted the distribution of the turns as dictated by a single principal cam, said cam being common to all the mandrels and performing a relative rotating uniform motion with respect to the rotating table itself.

This solution provides two main technical advantages: in fact it permits making the masses mounted on the rotating table remarkably less heavy and less bulky, limiting at the same time the maximum diameter of the table; and it also permits effecting the adjustments and/or variations in the winding parameters once only for all the mandrels, thus achieving a greater certainty of control uniformity and time saving. Another practical advantage, then, derives from the fact that costs no longer depend so much on the number of winding mandrels: as a consequence there is the advantage that it is no longer strictly necessary to have very high speeds for the mandrels, time being saved — with lower rotating speed — by increasing correspondingly the number of the mandrels.

According to a further important feature of the present invention the rotation axis of the rotating table and of the spool holder is horizontal. This solution, as is easy to gather, permits reaching easily the spool holder, since the spools rotate substantially at the same level as the mandrels and can be replaced in a position which is more handy for the operator. Also the possibility of inspecting the wire between the spools and the mandrels is remarkably improved.

Another important characteristic of the machine of the present invention lies in the fact that the rotation of the rotating table bearing the winding mandrels, with respect to the fixed stations for the automatic complementary operations, is made independent from the rotation of the feeding spool holder, so that to the rotating table can be imparted an advancement movement by steps, while the said spool holder is made to rotate at a constant speed equal to the average speed of the rotating table, the instantaneous difference of reciprocal position between the axis of each spool and the axis of the corresponding mandrel being absorbed by the flexibility of a stretch of wire left free between the feeding spool itself and the mandrel.

This solution therefore implies a further advantage lying in the fact that — without introducing complicated oscillating movements for the complementary automatic equipments — it is possible to reduce the mass in intermittent motion, the heavy wire feeding spools having a continuous rotating movement.

BRIEF DESCRIPTION OF THE DRAWINGS

Other characteristics of the invention will be apparent from the description given hereinafter with reference to the accompanying drawings, by way of non-limitative examples, in which.

DESCRIPTION OF THE PREFERRED EMBODIMENT

Figure 1:
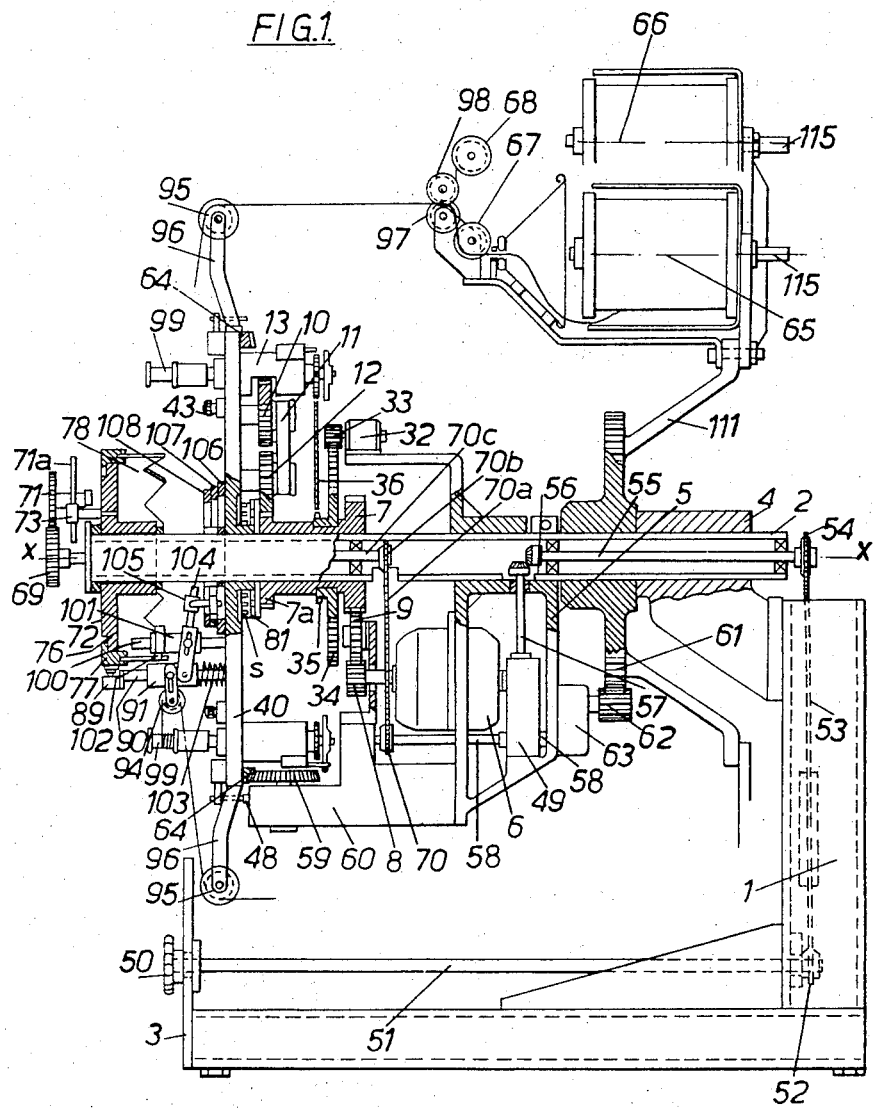
FIG. 1 is a general view of the machine, along a partial axial section.

In FIG. 1 is represented, as already said, the whole of the machine of the invention; to obtain greater clarity in the drawings the movement members are shown only once, while it must be understood that said members are repeated for each of the mandrels arranged along the machine periphery.

The carrying structure 1 is essentially in the shape of a stand (see also FIG. 4) bearing a main shaft 2 supporting the apparatuses, and is partially closed by a front plate 3; the latter is meant to support the devices necessary to effect the complementary operations.

The shaft 2 having tubular shape is encased at one end in a cast piece 4 which is part of the carrying structure; the shaft 2 projects horizontally cantilevered from piece 4 in order to support most of the members of the machine.

First of all on shaft 2 is mounted frame 5 bearing a main motor 6, preferably an electric motor, capable of rotating at different speeds by means of electric switching.

Figure 2:
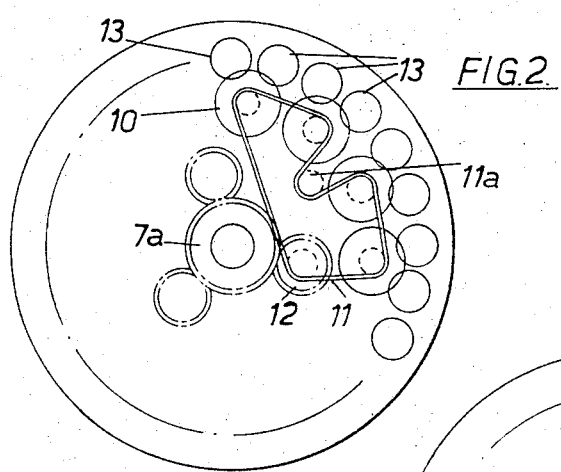
FIGS. 2 and 3 are two diagrams of motion transmission means from central motor means to a group of eight mandrels, respectively for high and low speed.

By the motor 6 rotation is transmitted to a toothed wheel 7 through a pinion 8 and gearing 9. The wheel 7 is part of a sleeve rotating on the shaft 2, at the other end of which there is provided a crown gear 7a (FIGS. 1 and 2).

The said crown gear 7a imparts its own rotation to a series of wheels 10, uniformly distributed about the periphery of the rotating table, through belts 11 and toothed wheels 12.

In the shown arrangement use is made of three toothed wheels 12 engaging with the crown gear 7a in positions at 120° from each other; therefore each wheel 12 controls a sector of 120° comprising a pulley fixed to the wheel 12 itself, a belt 11 engaging the said pulley, four wheels 10 driven by the belt 11 and eight mandrel groups 13 driven by the wheels 10. The belt 11 and the pulleys are toothed in order to avoid undesired slipping. FIG. 2 shows the elements relative to only one sector of 120°, to obtain greater clarity in the drawing, but it is to be understood that the complete machine includes three wheels 12, three belts 11, twelve wheels 10 and twenty-four mandrel groups 13, as is better specified hereinafter. Preferably there is provided also a registrable pulley 11a, having the function of keeping the belt 11 stretched.

Each wheel 10 sets in motion several winding mandrels 13, as better specified hereinafter with reference to FIG. 6.

Figure 6:
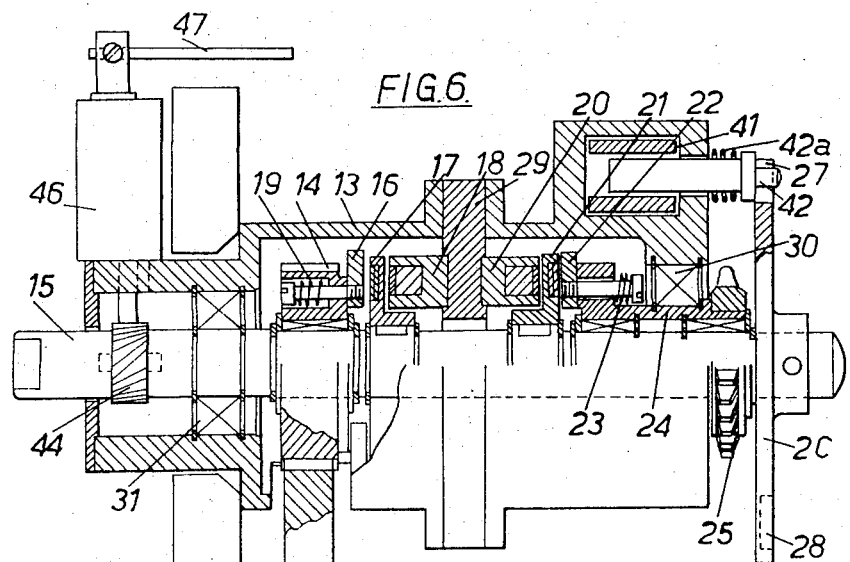
FIG. 6 is a schematic axial section, on an enlarged scale, of structure associated with a winding mandrel.
Figure 6A:
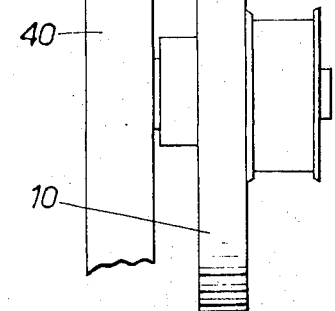
FIG. 6a is a front view of a turn counting device combined with the mandrel of FIG. 6.

A pinion 14 normally idle on mandrel shaft 15 engages with the wheel 10 (FIG. 6). The pinion 14 can be fixed to the shaft 15, to drive it in rotation, when the anchor 16 mounted on said pinion is attracted by the magnet joint 17, 18. The part 17 of the joint is pivoted on the shaft 15. Spring means 19 tend to bring the anchor 16 back to its rest position, when the action of joint 17, 18 comes to an end. Said joint 17, 18 is of a friction type in order to permit smooth clutching at the moment of coupling between pinion 14 and shaft 15. Through the means 14 to 18 described above, therefore, there is effected — for the 24 mandrel groups 13 — drive at what is called "high speed".

Mandrel group 13 also comprises a second magnetic friction joint specularly symmetrical to joint 18, 17, 16, consisting respectively of parts 20, 21 and 22. Part 21 is pivoted on shaft 15; anchor 22 is axially movable, against the action of spring 23, on the sleeve 24 this latter being idly mounted on shaft 15.

On sleeve 24 is further pivoted a sprocket wheel 25, located outside the mandrel casing 13. Finally, at the rear end of shaft 15 is keyed a disc 26. This latter is provided with a slit 27 on its periphery, in which a pin 42 may be engaged under the action of spring means 42a; and electromagnet 41 is provided to retract pin 42 from slit 27 against the action of the spring 42a. Considering the high speed at which the shaft 15 can rotate the slit 27 of the disc 26 is dynamically balanced by a cavity 28 diametrally opposed. The coils 18 and 20 of electromagnets are fixedly mounted on a diaphragm 29 fixed to the mandrel casing 13. The shaft 15 rotates on a pair of bearings 30 and 31.

Figure 3:
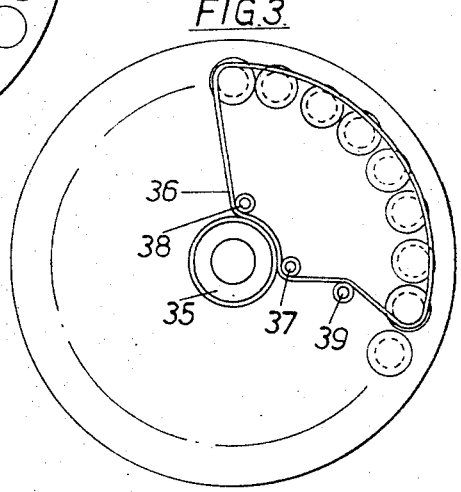

A small motor 32 (see FIG. 1) preferably three-phase having a fixed speed, is in turn mounted on the frame 5. By means of pinion 33 it transmits its rotation to a toothed disc 34, this latter being fixed to a crown sprocket gear 35. Therefore the crown gear 35 through the chain 36 which passes about idle pinions 37 and 38 (see FIG. 3), transmits rotation to the sprocket wheels 25 of the eight mandrel groups 13. A pinion 39 has the function of chain-tightener. By the above described means 20 to 36 is transmitted what is hereinafter called "low speed".

The casings 13 of the mandrels — which according to the shown embodiment, are in a number of 24, as already said, thanks to their structure which permits extremely small dimensions — are fixed, uniformly distributed, about the periphery of the rotating table 40 (FIGS. 1 and 6).

The rotating table 40 is rotatably mounted directly on shaft 2 and supports the already described toothed wheels 10 and 12.

The above clearly evidences how it is possible to maintain the main motor 6 in continuous rotation, with all the transmissions to pinions 14 of the mandrels, and respectively the secondary motor 32 with the respective transmissions to toothed wheels 25 without a possibility for said rotations to be transmitted to the mandrel shafts 15 at least until either one or the other of electromagnets 18 or 20 is actuated.

On the other hand, at the moment when the joint 18 is activated the mandrel shaft 15 is immediately driven at high speed or, respectively, at the moment when the joint 20 is activated the mandrel shaft 15 is immediately driven at low speed; the ratio between high and low speed can normally be 10:1 up to 50:1, but can of course be chosen even outside the said range according to the constructional requirements of the machine.

Normally joint 18 and joint 20 are never disengaged at the same time. Generally speaking, when joint 18 of high speed is disengaged also the electromagnet 41 is disengaged and pin 42, under the pressure of the respective pressure spring, engages in slit 27; in this case a slipping takes place on the joint 20 of low speed. At the moment when joint 18 is engaged and joint 20 disengaged, first of all the electromagnet 41 is energized in order to retract pin 42 from slit 27, thus freeing the disc 26. At the moment when joint 18 is disengaged joint 20 is instantaneously engaged and the shaft 15 passes from the high to the low speed by a quick but gradual slowing-down permitted by the slipping of the joint 20. Since at the moment when the pin 42 engages with the slit 27 it is necessary for the disc 26 to rotate already at slow speed, in order to avoid the risk of breakage, the de-energization of the electromagnet 41 is planned with a certain delay in respect to the disengagement of the joint 18, so that in this way the shaft 15 can stabilize itself at slow speed, before being blocked by the pin 42.

The blockage of shafts 15 by means of the pin 42 is indispensable when the winding is completed and during transfer of completed coils from one complementary station to the next.

The function of the slow-speed transmission is not limited to the slowing-down of the shaft 15, at the moment when the joint 18 is disengaged, but it is also extremely useful when complementary operations are effected on a completed coil, through devices (not shown) mounted on the plate 3.

In such cases, during the time in which the coil is at a standstill in one of the stations for complementary operations, it may be desirable to have the coil effect one or two turns around itself (for instance to effect taping). If so, the electromagnet 41 is energized for a brief moment — or in any case for a given previously planned time — so that it can retract pin 42 and free the disc 26; then the joint 18 drives the shaft 15, no longer braked, for one or more revolutions that is up to a new stop caused by the pin 42.

Furthermore, there is provided in combination with the joint 20 for slow speed, a rheostat 43 through which it is possible to effect an adjustment of the attraction force of the electromagnet 20, viz. in practice an adjustment of the maximum torque with which the joint drives the shaft 15. This adjustment allows — at the moment when the joint 18 is disengaged and the joint 20 engaged, that is at the passage from the high to the slow speed — controlling the slipping produced, viz. the delay with which the shaft 15 passes from the high to the slow speed. In practice said control is effected in such a way as to make equal for all the mandrels the number of revolutions that the coil effects during said speed decrease; in this way as is specified hereinafter, a reasonable tolerance is obtained in the numbers of turns wound on each coil.

In order to avoid said adjustment being spoilt by variations in the mains voltage, it is generally wise to feed the electromagnets 18 and 20 with a stabilized current.

As a rule it is also convenient with combine to the normal feeding also a buffer battery having the task of maintaining the feeding, independently of the feeding of the mains, in a stage of starting or stopping the machine and particularly in case of breaks by accident in the feeding of the mains; it is in fact absolutely necessary for each electromagnet to stay engaged or disengaged exactly for the planned program, independently of breaks in the normal feeding, in order not to alter the counting of the turns on each coil.

Finally with the shaft 15 is also combined a revolution indicator 46 or rather, a turn-indicator, taking motion from the pair of endless wheels 44 and helical gearing 45. The said turn-indicator 46 is of a simple type and not of a preselection type, which allows only a visual checking, also at intervals, of the number of turns produced on a coil, while other means mentioned hereinafter, drive the effective production of the desired number of turns. A small lever 47 drives the zero-setting of the turn-indicator, once a coil is completed. The actuation of the lever 47 takes place automatically when the lever itself passes in correspondency with the tooth 48 (see FIG. 1) mounted on the frame 5, during rotation of the table 40.

It is important to note that a failure in the turn-indicator 46 — contrary to what happens in known machines — does not affect the normal working of the respective mandrel in that the rotation of the latter is controlled by other means, shown in the drawing. It must also be noted that in the accompanying drawings the coils are mounted on projections of the mandrels shafts 15 (FIG. 1); it is moreover easy to provide supporting tail-blocks, substantially as in the known art.

On the shaft of the same main motor 6 from the end opposite the pinion 8, a speed changing device 49, which permits a continuous variation of the transmission ratio, is driven through mechanical means having a sufficient degree of positiveness or certainty. The ratio variation is effected by the handwheel 50 — which is located on the front part of the machine, beside the plate 3 — through a shaft 51, a toothed wheel 52, a chain 53, a wheel 54, a shaft 55, bevel gears 56 and a shaft 57. It is of course to be understood that, alternatively to the speed changing device 49 and the hand-wheel 50 it is possible to provide a box of interchangeable gearing, paying attention that said box must necessarily be handy for the operator, for which box there is provided a suitable transmission of the motion.

The outlet shaft 58 of the speed changing device 49, transmits the motion at one end to a conical wheel 59 through a gear box 60 effecting an intermittent motion and at the other end to a crown gear 61 through a pinion 62 and a transmission box 63. The conical wheel 59 is in engagement with the crown gear 64 fixed to the rotating table 40, so that the intermittent motion of the wheel 59 is taken up by the table 40 itself; the transmission of movement is such that the table 40 is made to advance by steps, each of an amplitude equal to a circular sector comprised between the positions of two adjacent mandrels. On the contrary the crown gear 61 is part of the rotating support of the spools 65–66, on which support also the respective wire-stretchers 67–68 are mounted. The transmission ratios, through the boxes 60 and 63 respectively, are such that the constant uniform angular speed imparted to the crown gear 61 is equal to the average angular speed imparted to the crown gear 64, considering in said average speed also the stopping times between one step and the next. The instantaneous displacements of the angular position of the mandrel axes with respect to the axes of the corresponding spools are absorbed by the flexibility of the wire sections being free between the wire stretchers 67 and 68 and corresponding guide means on the rotating table 40.

Figure 4:
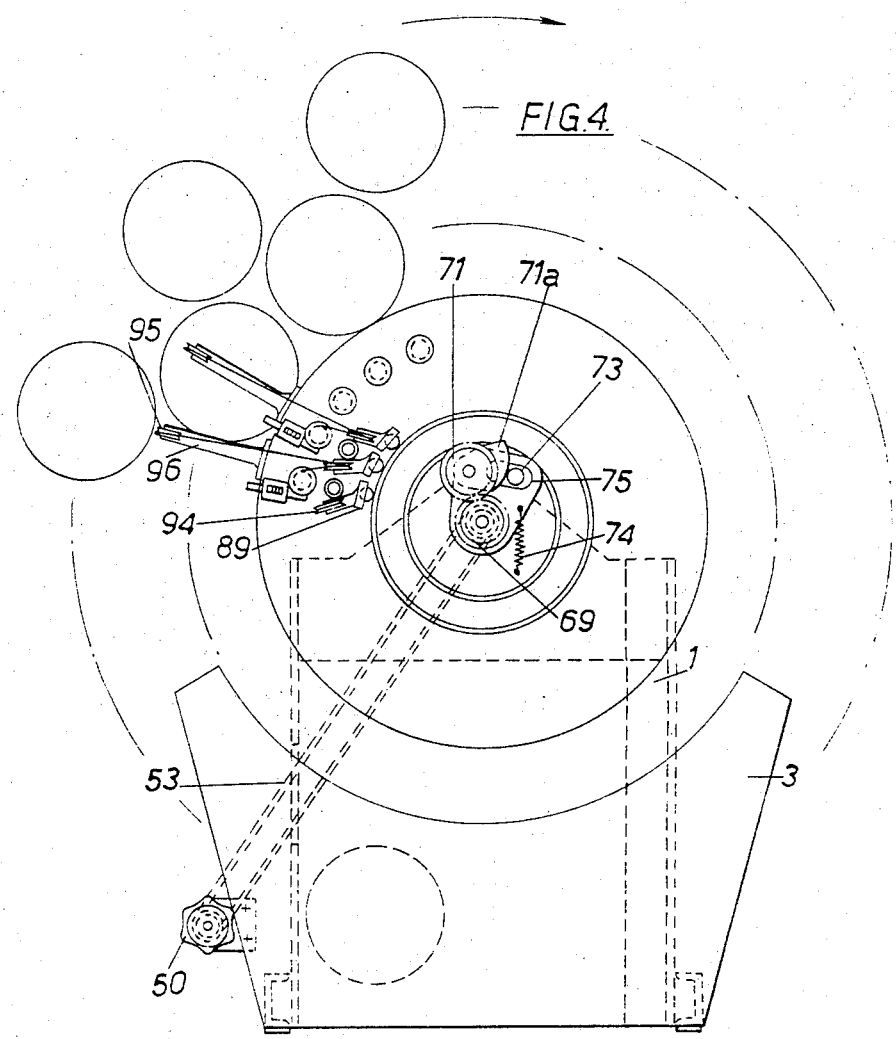
FIG. 4 is a front view, very schematic, of the machine showing the wires being wound on some only of the coils produced by the machine.
Figure 9:
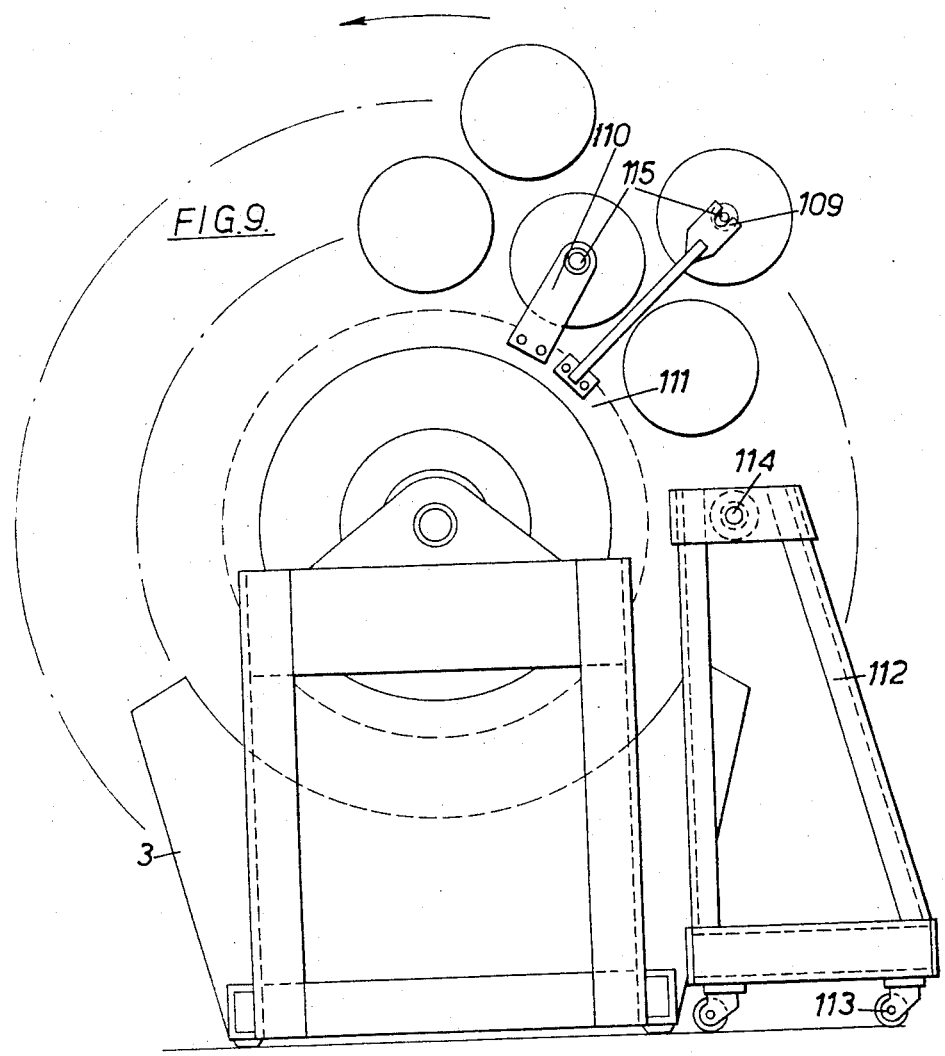
FIGS. 9 and 9a show the rear of the machine and the associated trolley to effect replacements of the spools.

As can be better seen in FIGS. 4 and 9, in order to maintain with a high number of mandrels sufficiently big spools 65–66 the latter are preferably staggered, in order to avoid mounting them along a circumference having too large a diameter; on the other hand, in consideration of the slow continuous movement of the spools, a large diameter does not give rise to dynamic problems.

The same shaft 58 transmits rotation to the pinion 69 through a transmission comprising a wheel 70 keyed on shaft 58; a chain 70a, a wheel 70b, and a shaft 70c on which pinion 69 is keyed. The pinion 69 imparts rotation to a pinion 71 and this latter to a compensating cam 71a fixed thereto (see FIG. 4). Said cam 71a which is called "compensating" owing to the reasons given below, transmits its movement directly to a main cam 72, thanks to the bearing of its profile against a cam-follower roller 73, said cam-follower being rotatable around a pin fixed in excentric position on cam 72. Said cam 72 is mounted freely rotatable but not slidable on shaft 2. A spring 74, fixed by one end to cam 72 and by the other to a plate 75 bearing the pivot of the elements 71–71a, ensures that the roller 73 is constantly bearing against the profile of cam 71a. The plate 75 is fixedly anchored to the front end of fixed shaft 2.

The motion that the compensating cam 71a imparts to the roller 73, viz. to the main cam 72, can be summarized as follows:

a. when the table 40 is at a standstill, the profile of the cam 71a — in constant uniform rotation — is such as to transmit to the roller 73 and therefore to the cam 72 a uniform progressive advancing or rotating movement; in other words the cam 72 is made to effect a constant uniform rotation in respect to the mandrels 13, and to the other members (mentioned hereinafter) supported by the table 40.

b. At the moment when it moves quickly, by one step, in a relatively brief time, the table 40 (carrying the said mandrels and members cooperating with the cam 72) would cause a displacement with respect to the said cam 72; at this moment, however, the profile of cam 71a becomes such as to cause a movement of cam 72 accompanying the movement of table 40. In practice, at this moment the profile of the cam 71a produces the desired compensation of the advancement movement of the table 40, so that the movement ultimately transmitted to the cam 72, considered in relation to the table 40, is always a uniform, continuous rotation.

Figure 7:
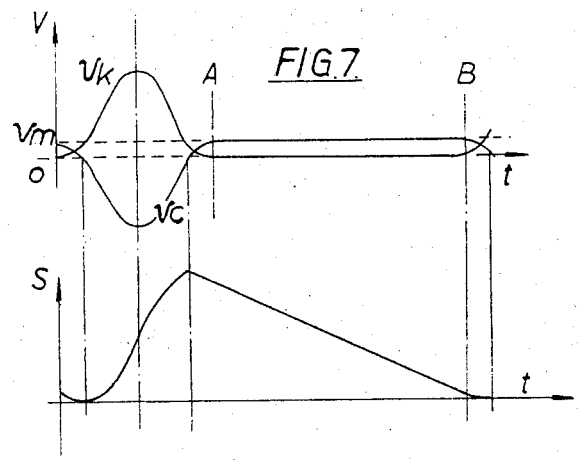
FIG. 7 shows two speed diagrams of the rotating table and of the main driving cam respectively, as well as the profile, in orthogonal coordinates, of a compensating cam.

The diagrams in FIG. 7 make this compensation effect clearer. The curve shown by Vc represents the values of the speed (in ordinates) transmitted to the roller 73 of the cam 71a, while the curve Vk represents the values of the speed of the rotating table 40. As can be seen in curve Vk, in the zone between A and B the speed of the table 40 is zero, viz. the table is at a standstill: during the same time A – B the curve Vc shows a constant speed, that is to say a uniform advancing movement of the roller 73 and cam 72. From point 0 to A the curve Vk shows a sudden variation in the speed of the table 40, from zero to a maximum and then again to zero, which corresponds to the fact that during time 0–A the table 40 has effected a step forward. At the same time, it can be seen from curve Vc that the speed imparted to the roller 73 falls as suddenly from the average value Vm to zero and down to a minimum below 0; this means that the roller 73, or better the cam 72, effects a backward rotation with respect to the fixed plate 75. The sum of the two curves Vk and Vc supplies a horizontal line Vm representing the constant, uniform rotation speed which is finally imparted to cam 72, considered in relation to the table 40.

The result of the operation described above, effected by the cam 71a, is therefore, in other words, to move cam 72 according to an oscillating movement which — compensating with the step movement of the table 40 — results in a relative movement of uniform constant advancement.

The further diagram in FIG. 7 shows in orthogonal coordinates space-time, the profile of cam 71a; of course this profile must be reproduced in polar coordinates and includes a correction taking into consideration the movement of the roller 73 which follows a circle-arc and not a rectilinear path.

Figure 5:
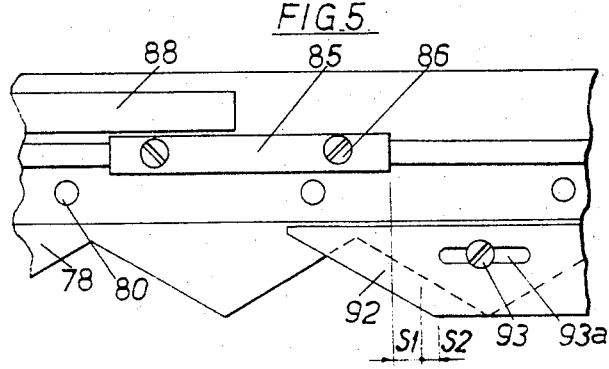
FIGS. 5 and 5a are respectively a side and a section view of a part of the main cam driving the machine.
Figure 5A:
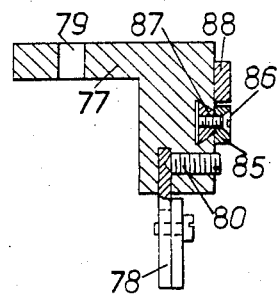

The cam 72 has a complicated structure, partially already known from U.S. Pat. No. 3,402,903. In fact it includes a bearing disc 76, rotatable but not slidable on shaft 2, through a sleeve part. On disc 76 is anchored a crown 77 (see also FIGS. 5 and 5a) bearing the real cam profile obtained from a steel tape 78. The crown 77 is fixed on the disc 76 in an interchangeable way, through e.g. screws (not shown) passing through holes 79 (see FIG. 5a); the tape 78 is in turn fixed to the crown 77 through screws 80.

Before examining other details of the structure of cam 72 it seems convenient to describe the whole of a disc 81 fixedly mounted on the shaft 2 (see FIG. 1).

Figure 8:
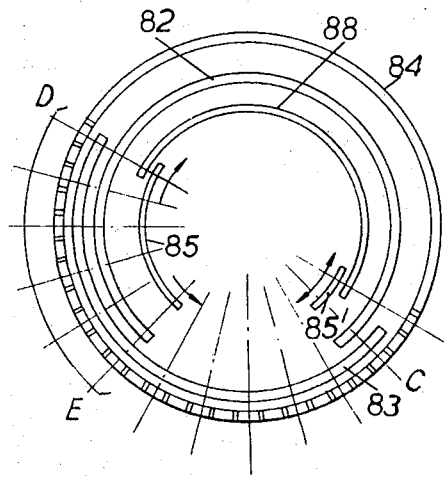
FIG. 8 is a diagram of the mandrel feeding slip rings, seen from the back part of the machine.

The disc 81 supports a series of concentric slip rings 82, 83, 84 which, seen from the back of the machine, have the appearance seen in FIG. 8. Through the said three slip rings and a series of twenty-four corresponding groups of three brushes S each, carried by the rotating table 40, as well as through a fourth mass connection (provided in any desired way) there is supplied current separately to the electromagnets 18, 20 and 41 of each of the twentyfour mandrel groups 13. The slip ring 82 feeds to the high speed joint 18, the slip ring 83 to the slow speed joint 20 and the slip ring 84 to the electromagnet 41.

The position C (FIG. 8) corresponds to the station in which the winding of each coil begins; in this position, therefore, the high speed is achieved through the clutching, at planned time, of the joint 18. The slip ring 82 begins in this position, for the engagement of joint 18.

The winding of each coil then proceeds during the transfer of the coil itself through successive stages, from position C until a position which can be chosen — according to the desired length of the winding, viz. the desired number of turns — between the position D and the position E. The slip ring 82 projects therefore over the whole of the arc C-D-E, to engage the joint 18, if necessary, over all said arc.

Starting from position D, as already said, the moment when the winding ends and the stopping of the coil takes place can be chosen. In consideration of this it is first of all necessary to effect commutation from high to slow speed. For this purpose the slip ring 83 starts in position D, to engage the joint 20. The slip ring 83 covers the whole of arc D – E and the next of arc E – C, the coil being subjected to the complementary operations during the transfer over the said arc E – C.

The slip ring 83 ends in position C, not quite where the ring 82 begins but overlapping the latter for a brief arc (similarly to what happens on arc D – E) to permit a certain adjustment also of the moment when the winding begins.

On arc C – D the slip ring 83 is absent because it is excluded that joint 20 may act on said arc; the absence of slip ring 83 is thus also a safety against accidental clutching of joint 20 on said arc. Similarly and for the same reason the slip ring 82 is absent from arc E – C. It is however obvious that if the safety obtained by the lack of said slip ring zones is considered superfluous — or if said safety is obtained in a different way — the slip rings 82, 83 can be gathered in a single slip ring continuous about all the circumference, starting from which the engagement of joint 18 as well as of joint 20 is effected. In this case there is also the advantage of saving one of the three brushes of each group of brushes of each of the twentyfour mandrels.

It is to be understood that the slip rings 82–83 merely supply the current, while the control of the communication from high to slow speed, and vice-versa, is effected through means mentioned below, located downstream of the slip rings themselves, that is to say on the rotating table 40.

The slip ring 84, feeding the electromagnet 41, is provided over the whole arc of 360°. From position C to position D it is continuous, because it is on this arc that the high speed is clutched and the feeding to the electromagnet 41 must be maintained, i.e. the pin 42 must in no case whatsoever effect a blocking.

On arc D — D — C on the contrary, the slip ring 84 is formed in sectors, electrically isolated from each other. This makes it possible to obtain the feeding of the electromagnets 41 — separately for each stopping position of table 40 — by a programming device located upstream of slip ring 84, i.e. in a fixed position of the machine. This arrangement permits the control of a brief rotation (as mentioned above) of the mandrels — separately the one from the other — generally producing only one or two revolutions of each coil around itself, for the execution of specific complementary operations.

In view of the control of the instants of beginning or ending of each coil winding, on the periphery of the crown 77 (FIGS. 5 and 5a) there is fixed an arc sector 85 in relief, in slider form, blockable by means of screws 86 cooperating with dovetail wedges 87, engaged in a groove of the crown 77 itself. Thanks to this assembly the sector 85 can be displaced and fixed in any chosen position along the crown 77. With this latter there is also combined in a fixed sector 88, also in relief like sector 85. In practice sector 85 is an adjustable projection of sector 88, both being meant to work on microswitches 89 associated with each mandrel group.

When the microswitch 89 of one mandrel group is set to cooperate with sector 85–88, it drives the commutation from slow to high speed of the mandrel itself. In FIG. 8 there is sketched the arrangement of sectors 85–88, with respect to the stopping positions of table 40, in particular with respect to positions C, D, E. It is evident that fixed sector 88 corresponds to arc C – D in which the high speed of the mandrels is always active; on the contrary an adjustable sector 85 of extent approximately equal to arc D – E, is provided for the control of the exact position of ending of the winding over the whole of said arc D – E, while a second brief sector 85' is provided in correspondency to position C, adjustable over a limited arc sector comprising the position C, for the adjustment of the exact position of beginning of the winding.

The microswitches 89 are on the ends of small columns 90, fixed to table 40 and having the function of guides for the wireguide groups 91.

Each wire-guide group of a mandrel comprises a pulley 94, receiving the wire from a pulley 95 supported by an arm 96 (FIGS. 1 and 4); all said elements are carried by table 40, rotating by steps.

The wire is fed to the pulleys 95 by the spools 65 and 66, through the wire stretchers 67 and 68 respectively, and the pulleys 97 and 98 respectively. Between pulleys 97 and 98 and pulleys 95 extend relatively long free sections of wire which absorb, as already said, the instantaneous differences of reciprocal position of the rotating table 40 and of the spools/ support.

Said wire sections are preferably maintained on a substantially cylindrical imaginary surface, the axis of which coincides with the axis of the shaft 2; inside said cylindrical surface there is sufficient room for the location of possible complementary apparatus.

From pulley 94 the wire passes onto coil core 99 on which it is wound thanks to the rotation of the coil core itself, driven by the respective mandrel shaft 15. The wire is distributed on coil 99 by cam 78 acting on pulley 94 through wire-guide 91. By the side of the small column 90 there is provided, for this purpose, a small column 100 on which the slide 101 is guided. The latter carries a finger 102 having the function of cam-follower, maintained in contact with the profile of the cam 78; this contact is ensured by the spring 103 pressing against the wire-guide 91 and, through the arm 104 fulcrumed in 105, also against slide 101.

The profile of cam 78 can be subject to a modification, or better to an adjustment, in correspondence with the adjustment of the movable sector 85. In fact, by varying for instance through the sector 85 the instant of the end of winding, it may so happen that when it stops the coil end results in an intermediate position of the coil itself; in some cases this fact may cause difficulties in the fixing of said coil end to the wire terminal or in the blocking of the turns by tape. Then it is possible to effect an adjustment of the profile of the cam 78 through the cam sector 92; this sector 92 can be shifted and fixed on cam 78 through at least one screw 93 engaging with a hole 93a of sector 92. The hole 93a permits the adjustment of the position of the sector 92, with respect to the cam 78.

Assuming that the commutation toward the slow speed is effected at the end of sector 85, the space S1 being absorbed for the stabilization of the mandrel at the slow speed, and that the electromagnet 41 is operated immediately afterwards, space S2 being absorbed before the stopping pin 42 intervenes definitely, the end of the space S2 represents the end of the coil: in this case it is possible to act — through a displacement of sector 92 which partially covers the profile of cam 78 — so that at the end of space S2 the wire-guide finds itself at one end of its stroke, namely at one end of the coil (as it is easy to understand from an examination of the cam profile resulting from the composition of cam 78 with cam sector 92).

Of course, as already said, the cam 78 can easily be interchanged on the disc 76 together with its crown 77 or separately therefrom, in order to modify the program by which the wire-guide is moved, that is to say the program by which the turns are distributed. However a partial and simpler adjustment of the basic profile of a given cam 78 can be obtained, according to the invention, directly through an adjustment of the means detecting the cam profile. For this purpose the position of the fulcrum 105 can be varied, with respect to the arm 104, in such a way as to obtain a modification in the transmission ratio of the movements, imparted by the cam 78, from slide 101 to slide 91, that is to the wire-guide. Therefore this permits driving the wire-guide according to different distribution patterns, starting from the same cam 78.

Figure 10:
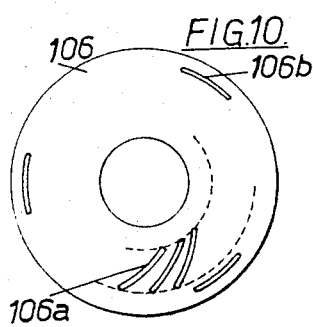
FIG. 10 shows a disc for the radial simultaneous positioning of the fulcrums of the wire-guide pantographs.
Figure 9A:
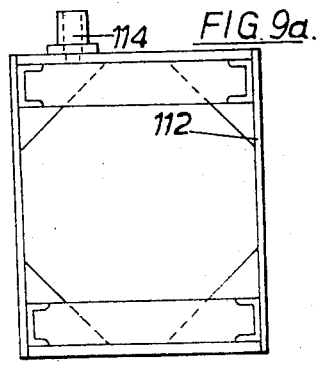

The simultaneous radial displacement of the fulcrums 105 relative to all the mandrels is obtained through the cooperation of the three discs 106, 107, 108 (co-axial with shaft 2) and of a pin carrying the fulcrum 105. The disc 106 is shown in detail in FIG. 10, from which it can be seen that it comprises arcuated slots 106a and circular slits 106b; in slits 106b are engaged fixed pins (projecting from the table 40 but not shown) serving to guide the disc 106 in a circular movement — with respect to table 40 — having limited amplitude. In each of slots 106a is engaged one pin of the fulcrum 105, corresponding to one of the 24 mandrels; however each pin is also engaged through radial slits of the fixed disc 108 and, with an enlarged guide collar, through enlarged radial slits of the fixed disc 107, this construction being such as to prevent the exit or disengagement of the pin itself from the slots 106a. In such a way, when rotation is imparted to disc 106 (by means not shown) the slots 106 a have the function of cams on each of the pin of the fulcrums 105, and cause their simultaneous displacement within the slits of discs 107 and 108 outwardly or inwardly according to the rotation direction of the disc 106.

Another important advantage of the structure according to the present invention consists, as already said, of the particular arrangement of the spools 65, 66 enabling their replacement from the rear part of the machine, at a level more handy for the operator. According to the present invention, the spools are supported on their rotating support 111 (FIG. 9) by arms 109 ending in a fork connection, or by arms 110 ending in a simple circular housing, said arms 109 and 110 being fixed by screws and nuts to the support 111. In order to facilitate the mounting and dismounting of the spools there is provided, for instance, a trolley 112, provided with revolving wheels 113, at the upper end of said trolley being welded a sleeve 114: for the dismounting of any spool it is sufficient to rotate the support 111 until the tang 115 (see also FIG. 1) of the spool itself is at the same level as the sleeve 114, then to insert said sleeve 114 onto said tang 115 and finally to free the spool from its respective supporting arm. An exactly opposite operation is effected when a spool must be mounted on the support 111.

Having thus completed the description in detail of all the structural features of the machine, it may be useful to summarize hereinafter the functioning of the machine itself, at least as to its main points.

When the machine is set in motion the motors 6 and 32 driven in a uniform continuous rotation the transmissions consisting of the three wheels 12 and of the three belts 11 and, respectively, of the sprocket gear 35 and of the three chains 36; the pinions 14 and the wheel 25 of all the twenty-four mandrels 13, independently of their position on the rotating table 40, are therefore carried in uniform constant rotation at the high and respectively at the slow speed.

At the same time, as shown above, the movements of the table 40 (step by step) and of the cam 72–78 (oscillating) begin: according to the structure described above said movements provide such a relative movement between the cam 72 and the wire-guides 91, that it can be considered equal to a movement of uniform continuous advancement of the wire-guides 91 with respect to the cam 78, considered as fixed.

Let us now consider a single mandrel: in a given fixed position of the machine defined by the position — which can in turn be considered as fixed — in which the sector 85'–88 of the cam 72 begins, are energized the joint 18 of the high speed and the electromagnet 41 relative to this mandrel, which is now located in correspondence to the said fixed position, the microswitch 89 of said mandrel being made to engage said sector 85'–88. The said mandrel is therefore driven at high speed. Previous to this position the operator (or an automatic device, not shown, but of a known type) has anchored the end of the wire fed by the pulley 94 onto the coil core mounted on the corresponding mandrel.

Therefore the winding of the coil begins when the high speed is clutched in, the distribution of the turns being determined by the cam profile 78. Owing to the rotation of the table 40 the axis of the above mentioned mandrel is displaced in turn, with respect to cam 72 and sector 88. When the relative microswitch 89 arrives at the end of the sector 88–85 it effects instantly the commutation from high to slow speed, and therefore, with a short delay, it disenergizes the electromagnet 41, the pin 42 of which sets in blocking position. The delay with which the blocking takes place with respect to the moment of commutation, corresponds to the space S1 + S2 as mentioned above (FIG. 5).

From the above it is clear that the number of turns being wound on each coil its — independently of any control of the turn indicator — directly proportional to the amplitude of the arc defined by the total length of the sectors 85' — 88 – 85, and hence automatically determined once for all the coils. This direct proportionality is effectively true in that the movement of the rotating table 40 and the high speed rotation of the mandrels derive from the same and sole source of motion — the motor 6 — through interconnected transmissions.

The only reason for uncertainty is thus that relative to the space S1 + S2, in which a few turns can be wound in addition to or less than the planned number, depending on the promptness of the braking action of the joint 20 and of the pin 42. However, apart from the fact that a difference of a few turns it must be noted that through the adjustment of the active torque of the joint 20 — obtained through the adjustment of the rheostat 43 — it is possible to determine the best conditions of commutation from the high to the slow speed, making said conditions uniform for all the mandrels; this is also done figuring beforehand the number of turns that could be formed in the space S1 + S2, and taking into account this number of turns when making the theoretical calculation of the coil and the general setting of the machine.

As already said, through the adjustment of sector 85 one obtains that the winding started in C (FIG. 8) is completed for instance after thirteen steps of the table 40, viz. in station D, when coils with a minimum of turns are involved, or after 18 steps, viz. in station E, when coils with the maximum number of turns are required, or in any intermediate station between D and E, however chosen. It must be particularly noted that the adjustment of sector 85 is extremely precise and permits not only choosing the most suitable stopping station but also, in a given station, to choose the most suitable stopping instant between the beginning instant and the ending instant of the stopping time of the table 40, or better, of the stopping time for the coil in the said station.

As can be easily understood, the above describes a machine for high performances, in the sense of both quality and quantity of the finished product.

In fact, already the possibility of operating with 24 winding mandrels —which furthermore, thanks to their small dimensions, permit employing a table 40 having relatively small diameter — proves a remarkable improvement over the known art (which generally employs no more than eight or 12 winding heads).

Furthermore said high number of winding mandrels, and therefore of corresponding stations of the table 40, permit using a good number of said stations for the complementary operations, without thus affecting negatively the capacity of production of the machine. For instance in FIG. 8 there is suggested the employment of a number up to 19 stations to effect the winding and of a minimum of five stations for the complementary operations. This number of complementary stations, already high, in percentage over the total number of stations is still a low number, but on the other hand it permits on the same machine a practically complete finishing of the coils, maintaining at the same time the desired high production of the machine.

On the other hand the basic structure of the machine according to the present invention can still be simplified when the requirements of production are reduced.

Suppose that a machine is required, for instance, solely for the production of coils having a very high number of turns, on which however no complicated complementary operations are needed: suppose only a loading station, an unloading station and a station for the fixing of turns are required, all the other stations being left available for the winding. In this case the machine of the invention can be simplified by deleting on one hand the box 60, producing the intermittent movement, and then causing the table 40 to rotate by uniform motion, in syncronism with the motion of the spool support 111, and on the other by deleting the group of the cam 71 and oscillating support 75, making at the same time the cam 72 fixed to shaft 2. Again, in an extremely simple way, the necessary uniform relative motion between table 40 and cam 72 is carried out, while with regard to the complementary operations it is possible to provide: a) a manual loading, in which the operator has no difficulty in following with his hand the movement of the table 40 — very slow, after all — while effecting the loading; b) an automatic unloading, quick, capable of acting at the passage of the coil through a given station; c) an automatic fixing of the turns, e.g. with wax, applied by a fixed pad, on which the coil itself slides during its passage.

It is in any case to be understood that the invention is by no means limited to the embodiment described herein and shown in the accompanying drawings, but that it comprises all the possible variations which come within the scope of its generic principles and of its spirit.

I claim:

1. A multiple coil-winder for the production of coils having an average or high number of turns, comprising: a rotating table; a plurality of rotating mandrels mounted about the periphery of said table, means mounting said mandrels on said table with their axes of rotation parallel to the axis of rotation of said table, each mandrel supporting and driving in rotation a coil to be wound; centralized driving means common to all said mandrels; coupling means associated with each mandrel, said centralized driving means imparting rotation to said mandrels through said coupling means; a plurality of wire guides, means mounting said guides directly on said table for reciprocating movement parallel to the axes of said mandrels, each wire guide being associated with a mandrel to distribute the wire being fed to the coil to be wound; centralized control means common to all said wire guides controlling on the one hand the reciprocating movement of each wire guide and on the other hand the coupling condition of said coupling means of each mandrel; and a revolving spool support carrying a plurality of supply spools, each supply spool being associated with a mandrel; said spool support being rotatably mounted coaxially of said rotating table, said centralized driving means driving in rotation both said rotating table and said spool support through separate transmission means.

2. A multiple coil-winder as in claim 1, in which said driving means comprises a main motor (6) mounted on the frame of the machine, a main central crown gear (7a) co-axial with the rotating axis of the rotating table (40) and deriving motion from the said motor (6), a plurality of gears (14) coaxially mounted on said mandrels and a motion transmission between said main motor and each of said gears (14).

3. A multiple coil-winder as in claim 2, in which said motion transmission comprises a first toothed wheel (12) rotating around a pivot carried by the rotating table, said wheel engaging said main crown gear (7a), a series of second wheels (10) in engagement with said gears (14) and a belt transmission (11) connecting the said first toothed wheel (12) to at least part of the second wheels of said series.

4. A multiple coil-winder as in claim 1, in which each mandrel has a mandrel shaft (15), between each mandrel shaft and said gear (14) co-axial thereto being inserted disengageable coupling means to transfer the rotation of said gear (14) to said mandrel shaft.

5. A multiple coil-winder as in claim 4, in which said coupling means consist of a friction joint (16, 17, 18) electromagnetically driven.

6. A multiple coil-winder as in claim 1, in which said centralized control means further comprises secondary driving means to impart a complementary slow rotation speed to each mandrel.

7. A multiple coil-winder as in claim 6, in which said secondary driving means comprises a secondary motor (32) mounted on the fixed frame of the machine, a secondary sprocket gear (35) co-axial with the rotation axis of the rotating table (40) and deriving its motion from the said secondary motor (32), a plurality of gears wheels (25) each gear wheel being co-axially mounted with respect to a mandrel shaft, and a chain (36) engaging on one side the said secondary sprocket gear (35) and on the other at least a part of said gear wheels (25).

8. A multiple coil-winder as in claim 7, in which between each mandrel shaft (15) and the respective gear wheel (25) co-axial thereto, are inserted coupling means which can be actuated, to transfer the rotation of said gear wheel to said mandrel.

9. A multiple coil-winder as in claim 8, in which said coupling means consist of an electromagnetic friction joint (20, 21, 22).

10. A multiple coil-winder as in claim 9, in which means for the adjustment of the value of the driving torque are combined with said electromagnetic friction joint (20,21,22).

11. A multiple coil-winder as in claim 10, in which said adjustment means consist of a rheostat controlling the intensity of the current supplied to the electromagnet coil (20) of the friction joint.

12. A multiple coil-winder as in claim 1, and blocking means for stopping each mandrel.

13. A multiple coil-winder as in claim 12, in which said blocking means comprises at one end of disc (26) keyed on the mandrel shaft and at the other a pin (42) adapted to be engaged in a slit (27) of said disc (26).

14. A multiple coil-winder as in claim 13, in which said blocking pin (42) is subjected at one end to the action of spring means tending to maintain the pin (42) constantly in engagement with said slit (27) and at the other to the action of an electromagnet (41) which is energized to disengage said pin from said slit (27).

15. A multiple coil-winder as in claim 1, in which with each mandrel is combined a simple turn-counter which can be zero set.

16. A multiple coil-winder as in claim 1, wherein said centralized control means comprise an axially operating main cam mounted for rotation on the same axis as said rotating table and revolving spool support, and synchronizing means, said contralized driving means imparting rotation to said main cam through said synchronizing means.

17. A multiple coil-winder as in claim 16, in which the profile of said cam controls the turn distribution and motor means associated with the cam and the rotating table, said motor effecting a relative constant and uniform rotating movement between the said main cam and the said rotating table.

18. A multiple coil-winder as in claim 17, in which said main cam is fixed on the axis of the rotating table while the latter is moved in a continuous uniform rotation around said axis by the said motor means.

19. A multiple coil-winder as in claim 17, in which said motor means comprise a main motor (6) mounted on the frame of the machine and a double transmission, said transmission comprising means (59–60) to impart a rotation step by step to the rotating table and means (58–69) to impart to the main cam (78) an oscillating rotary movement around the axis of the rotating table, the combination of the table step movement and of the main cam oscillating movement resulting in a constantly uniform relative movement between table and main cam.

20. A multiple coil-winder as in claim 19, in which said means to impart to the main cam (78) the said oscillating movement comprise a secondary cam (71a) to which a transmission deriving from the said main motor (6) imparts a uniform constant rotating movement, around a secondary fixed axis eccentric with respect to the axis of the main cam, and a cam follower (73) integral with the main cam (78) and transmitting the movement of the secondary cam to the main cam.

21. A multiple coil-winder as in claim 17, in which each wire-guide comprises a first slide (91) supporting a return pulley (94) for the wire feeding to the coil to be wound, said first slide (91) moving parallel to the axis of the coil, a second slide (101) moving parallel to the first slide and supporting the said testing means (102), and an arm (104) connecting the said first and the said second slide, for the transmission of the movement of said testing means (102) to the return pulley (94).

22. A multiple coil-winder as in claim 21, in which the position of the fulcrum (105) of said arm (104) can be adjusted, in order to vary the transmission ratio of the movement transmitted from the said second slide (101) to the said first slide (91).

23. A multiple coil-winder as in claim 22, in which the adjustment of the position of the fulcrum (105) of said arm (104) is carried out by control means (106, 107, 108) adapted to operate simultaneously on the fulcrums of all the wire-guides.

24. A multiple coil-winder as in claim 17, in which between the said rotating mandrels and the said centralized control means there is inserted a de-energizable motion transmission controlled by said main cam.

25. A multiple coil-winder as in claim 24, in which the said main cam (78) comprises secondary cam means (85 – 88 – 85') mounted in given pre-set adjustable positions along its profile, said cam means driving a microswitch combined with each mandrel, said microswitches energizing or de-energizing the said motion transmission.

26. A multiple coil-winder for the production of coils having an average or high number of turns, comprising a rotating table, a plurality of rotating mandrels mounted on the periphery of said table, each mandrel supporting and driving in rotation a coil, and a rotating spool support, said support rotating coaxially of said table and carrying a plurality of wire-feeding spools, and driving means to impart rotation to said table and spool support, means imparting to the spool support a uniform continuous rotation and to the rotating table a step-by-step rotating movement, the average speed of said step-by-step movement, taking into consideration also the stopping times, being equal to the uniform continuous speed of the spool support.

27. A multiple coil-winder for the production of coils having an average or high number of turns, comprising: a rotating table; a plurality of rotating mandrels, means mounting said mandrels about the periphery of said table, each mandrel supporting and driving in rotation a coil to be wound; a plurality of wire guides, means mounting said wire guides directly on said rotating table for reciprocating movement parallel to the axes of said mandrels, each wire guide being associated with a mandrel to distribute the wire being fed to the coil to be wound; a revolving spool support carrying a plurality of supply spools, each supply spool being associated with a mandrel; and centralized driving means common to all said mandrels for imparting rotation to said mandrels, to said rotating table and to said spool support, through separate transmission means, the rotation axis of said rotating table and of the revolving spool support being horizontal, said mandrels projecting from the rotating table on one side of the table, while said spool support and supply spools are disposed on the opposite side of the table.

* * * * *